United States Patent
Lin et al.

(10) Patent No.: US 9,742,292 B2
(45) Date of Patent: Aug. 22, 2017

(54) MULTIFUNCTION POWER CONVERSION DEVICE

(71) Applicant: INNO-TECH CO., LTD., Taipei (TW)

(72) Inventors: Shu-Chia Lin, Taipei (TW); Ching-Yuan Lin, Taipei (TW); Chih Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 15/047,629

(22) Filed: Feb. 19, 2016

(65) Prior Publication Data

US 2017/0117809 A1 Apr. 27, 2017

(30) Foreign Application Priority Data

Oct. 22, 2015 (TW) .............................. 104134718 A

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 3/33515* (2013.01); *H02M 2001/0009* (2013.01)

(58) Field of Classification Search
CPC ....................... H02M 3/33523; H02M 3/33515
See application file for complete search history.

(56) References Cited

U.S. PATENT DOCUMENTS

| 6,664,817 | B2* | 12/2003 | Nakata | G01R 19/175 |
| | | | | 327/451 |
| 8,576,588 | B2* | 11/2013 | Kuang | H05B 33/0815 |
| | | | | 363/21.13 |
| 8,625,309 | B2* | 1/2014 | Kawamura | H02M 3/33523 |
| | | | | 363/21.01 |
| 9,084,318 | B2* | 7/2015 | Yao | H05B 33/0815 |
| 2014/0254215 | A1* | 9/2014 | Brinlee | H02M 3/33507 |
| | | | | 363/21.15 |

* cited by examiner

*Primary Examiner* — Emily P Pham
(74) *Attorney, Agent, or Firm* — Lin & Associates Intellectual Property, Inc.

(57) ABSTRACT

A multifunction power conversion device for dynamical detection includes an input filter unit, a transformer, a switching transistor, a driving controller, a feedback unit and an output unit. Two sensing signals from the primary and auxiliary coils of the transformer form a current sensing zero detection signal. The digital control unit of the driving controller determines if a current flowing through a secondary coil of the transformer is reduced to zero due to discharging, and further finds valley of the current of the secondary coil. The switching transistor is turned on after a preset number of the valley and then turned off by a process of current sense. Therefore, the present invention greatly reduces switching loss, increases efficiency of power conversion, and particular, enhances flexibility of application to meet actual requirements by simply updating program executed by the digital control unit.

9 Claims, 5 Drawing Sheets

MULTIFUNCTION POWER CONVERSION DEVICE

CROSS-REFERENCE TO RELATED APPLICATION

This application claims the priority of Taiwanese patent application No. 104134718, filed on Oct. 22, 2015, which is incorporated herewith by reference.

BACKGROUND OF THE INVENTION

1. Field of the Invention

The present invention generally relates to a multifunction power conversion device, and more specifically to a multifunction power conversion device for generating a current sensing zero detection signal by combining a sensing signal from a primary coil and an auxiliary sensing signal from an auxiliary coil to transmit to a single signal pin such that a digital control unit determines if a current flowing through a secondary coil reduces to zero according to the current sensing zero detection signal, and further detects valley and a number of valley for the current of the secondary coil, thereby turning on a switching transistor to reduce switching loss, and performing a process of current sensing to determine whether to turn off the switching transistor when the switching transistor is turned on.

2. The Prior Arts

For various electronic devices, some specific electric powers are required for normal operation. Some integrated circuits (ICs), for instance, need 5V or 3V, electric motors need 12V DC power, and the backlight modules for LCD monitor need a much higher voltage like 1150V. To meet the requirement for power source, high quality and efficient power converters have become a key component and been progressively developed and widely used. Currently, the power converter is one of the key components in electronic products.

As shown in FIG. 1, one of the power conversion circuits in the prior arts generally comprises an input filter unit 10, a transformer TR, a switching transistor 20, a driving controller 30, a feedback unit 40 and an output unit 50. The transformer TR substantially comprises a primary coil LP, a secondary coil LS and an auxiliary coil LA. The switching transistor 20 is a traditional MOS (metal oxide semiconductor) power transistor. The input filter unit 10 receives and filters an AC power VAC to generate and transmit an input power VIN to the primary coil LP. The drain of the switching transistor 20 is connected to the primary coil LP, and the source of the switching transistor 20 is connected to the sensing resistor RS to generate a current sensing signal CS. The gate of the switching transistor 20 is connected to the driving controller 30 to receive the driving signal GATE from the driving controller 30.

The secondary coil LS generates a sensing current through induction of the primary coil LP, and the output unit 50 generates an output power VOUT based on the sensing current. The feedback unit 40 receives the output power VOUT to generate and transmits a feedback comparison signal COMP to the driving controller 30. The auxiliary coil LA generates an auxiliary sensing voltage by induction of the primary and secondary coils LP/LS. Further, the auxiliary sensing voltage is divided by a first dividing resistor R1 and a second dividing resistor R2 connected in series to generate a zero detection signal ZC at the connection of the first dividing resistor R1 and the second dividing resistor R2, which is further transmitted to the driving controller 30.

The driving controller 30 employs the zero detection signal ZC to perform a zero detection process to find the valley of the current flowing the secondary coil LS, and determine the conduction state. At the same time, the feedback comparison signal COMP is used to obtain the value of the output power VOUT such that the driving controller 30 generates the driving signal GATE for turning on/off the switching transistor 20. In other words, when the switching transistor 20 is turned on, the turn-on voltage increases to cause the current sensing signal CS to increase. When the current sensing signal CS is larger than the preset value, the switching transistor 20 is turned off. Additionally, when the switching transistor 20 is turned off, the auxiliary sensing current flowing through the first dividing resistor R1 and the second dividing resistor R2 first increases up to a peak value, then reduces and causes oscillation. Thus, the driving controller 30 utilizes the zero detection signal ZC to detect the zero, that is the valley, so as to determine whether to turn on the switching transistor 20 for minimal switching loss.

However, one of the shortcomings of the above power conversion in the prior arts is that the driving controller has to configure two signal pins to receive the sensing signal from the primary coil and the auxiliary sensing signal from the auxiliary coil, respectively. The area of the first and second dividing resistors is quite large. As a result, the cost of the circuit layout increases, particularly for the integrated circuit.

Therefore, it is greatly needed for a new multifunction power conversion device for dynamical detection, wherein the current sensing zero detection signal is generated by directly combining the sensing signals from the first and auxiliary coils and transmitted to the single sensing pin. The digital control unit utilizes the current sensing zero detection signal to determine if the second side current discharges to zero, and detects the valley and the accumulated number of the valley so as to determine whether to turn on the switching transistor. When the switching transistor is turned on, the current limiting process is performed to determine whether to turn off the switching transistor. It is obvious that switching loss is greatly reduced, efficiency of power conversion is improved, and industrial utility is provided. In particular, the digital control unit operates in a fully digital manner to meet actual requirements by just updating the firmware program to greatly enhance flexibility in application, thereby overcoming the above problems in the prior arts.

SUMMARY OF THE INVENTION

The primary objective of the present invention is to provide a multifunction power conversion device for dynamical detection, generally comprising an input filter unit, a transformer, a switching transistor, a driving controller, a feedback unit and an output unit. The transformer comprises a primary coil, a secondary coil and an auxiliary coil. The switching transistor is a MOS (metal oxide semiconductor) power transistor, and has a drain, a gate and a source. However, the switching transistor can also be implemented by any other electronic driving element, such as a bipolar transistor.

The input filter unit receives and filters an AC power to generate an input power.

One end of the primary coil is connected to the input filter unit for receiving the input power, and an auxiliary sensing voltage is generated by the auxiliary coil due to induction of the primary and secondary coils. In addition, one end of the auxiliary coil is grounded. The secondary coil generates an induction current by induction of a current flowing through the primary coil, another end of the auxiliary coil is connected to one end of a zero detection diode, and another end of the zero detection diode is connected to one end of a zero detection resistor.

The drain of the switching transistor is connected to another end of the primary coil.

The driving controller generates and transmits a driving signal to the gate of the switching transistor to control a process of turning on/off for the switching transistor.

The output unit receives the induction current of the secondary coil, and, comprises an output capacitor and an output diode. A positive end of the output diode is connected to one end of the secondary coil, and another end of the secondary coil is grounded and further connected to one end of the output capacitor. Another end of the output capacitor is connected to a negative end of the output diode, and an output power is generated at the negative end of the output diode such that the output unit provides an output current.

Another end of the zero detection resistor is connected to the source of the switching transistor and one end of a sensing resistor, and another end of the sensing resistor is grounded. The another end of the zero detection resistor generates and transmits a current sensing zero detection signal to the driving controller. One end of the feedback unit is connected to the negative end of the output diode for receiving the output power, and a feedback control process is performed by the feedback unit to generate a feedback comparison signal, which is transmitted to the diving controller.

The diving controller receives the current sensing zero detection signal and the feedback comparison signal to perform a zero detection process and a current monitoring process so as to generate the driving signal as desired.

Furthermore, the driving controller comprises a first analog-to-digital converter (ADC), a second ADC, a third ADC, a PWM (Pulse Width Modulation) driving unit, a digital control unit, a valley detection unit, a current detection unit, a current limiting unit and a protection unit.

The first ADC receives and converts the feedback comparison signal into a corresponding digital comparison signal, and the second ADC and the third ADC simultaneously receive the current sensing zero detection signal and generate a digital current sensing signal and a digital zero detection signal, respectively.

During the switching transistor is turned on, the current limiting unit receives the current sensing zero detection signal and generates a current limiting signal when the current sensing zero detection signal is larger than a preset value, indicating that a turn-on current of the switching transistor is overestimate.

The digital control unit receives and utilizes the digital comparison signal, the digital current sensing signal, and the digital zero detection signal and the current limiting signal to generate and transmit a PWM control signal. The PWM driving unit generates the driving signal based on the PWM control signal.

The digital control unit controls the protection unit based on the current limiting signal to generate and transmit a protection signal to the PWM driving unit for turning off the switching transistor.

Additionally, when the switching transistor is turned on, the digital control unit uses the current sensing zero detection signal to determine whether to turn off the switching transistor through the driving signal. When the switching transistor is turned off by the driving signal, the digital control unit further utilizes the digital zero detection signal to detect valley through the zero detection process, and calculates an accumulated number of valley for determining whether to turn on the switching transistor after a preset number of valley, thereby reducing switching loss.

Moreover, another object of the present invention is to provide a multifunction power conversion device, comprising an input filter unit, a transformer, a switching transistor, a driving controller and an output unit. In particular, a first side feedback function for power conversion is implemented without any feedback unit.

More specifically, the driving controller comprises a second ADC, a third ADC, a PWM driving unit, a digital control unit, a valley detection unit, a current detection unit, a current limiting unit and a protection unit.

When the switching transistor is turned off, the driving controller first detects an auxiliary coil voltage VAUX indicated by (VOUT+Vf)*(NA/NS) before the current flowing through the secondary coil reduces to zero due to discharge, where Vf is a turn on voltage for the zero detection diode, NA is a winding number of the auxiliary coil, and NS is a winding number of the secondary coil. Further, when the switching transistor is turned on, an auxiliary coil voltage of the auxiliary coil is specified by VAUX=−VIN*NA/NP, where NP is a winding number of the primary coil. Especially, when the switching transistor is turned off, a specific equation below is used to obtain the output current according to the voltage and current of the secondary coil sensed by the auxiliary coil, $$I_{OUT}(t) = \frac{1}{2} \times \frac{t_{OFF}(t)}{t_S(t)} \times I_{DOUT\_PK}(t)$$
$$= \frac{1}{2} \times \frac{t_{OFF}(t)}{t_S(t)} \times \frac{N_P}{N_S} \times \frac{V_{CS\_PK}(t)}{R_{CS}}$$

where tOFF is a time width when a current of the output diode is not zero, tS is a period of the driving signal, IDOUT_PK is a maximum peak value of the current of the output diode, and VCS_PEAK is a maximum peak value of the current sensing zero detection signal.

Therefore, the digital control unit obtains IDOUT_PK by detecting the digital current sensing signal, and tOFF, tS and IDOUT_PK are brought into the above equation to calculate IOUT, thereby acquiring the loading state. As a result, the switching transistor is turned off when the output current is larger than a preset value. Thus, the first side feedback function for power conversion is implemented just through simple calculation by the digital control unit without any feedback unit.

The multifunction power conversion device of the present invention greatly reduces switching loss and dramatically increases efficiency of power conversion so as to provide considerable industrial utility. In particular, the digital control unit operates in a fully digital manner to meet any actual requirements by just updating the firmware program, thereby greatly enhancing flexibility in application.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
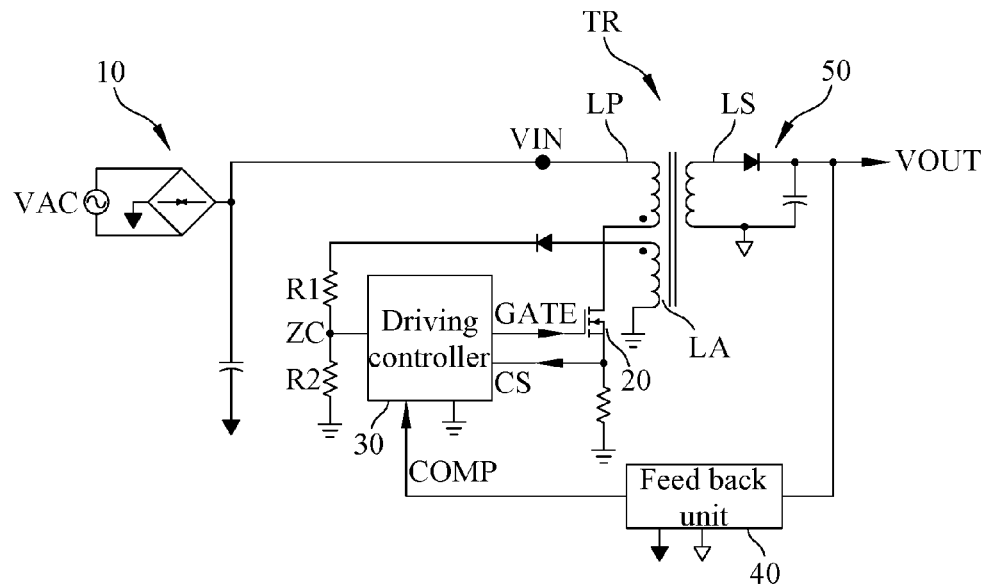
FIG. 1 is an illustrative view showing the power conversion circuit in the prior arts.
Figure 2:
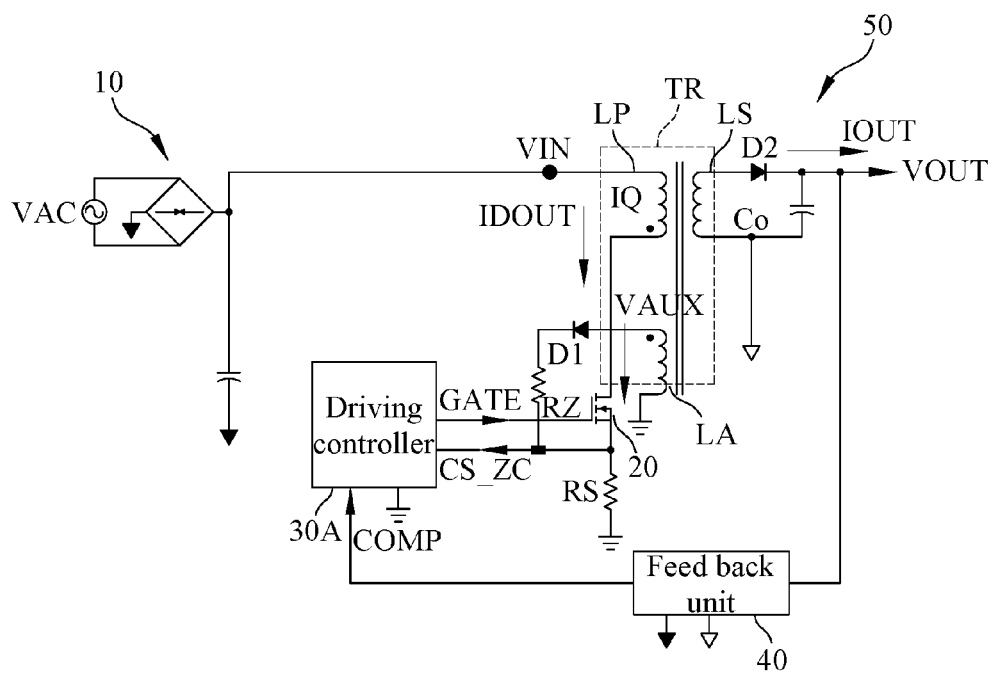
FIG. 2 is a view of the multifunction power conversion device according to the first embodiment of the present invention.

Please refer to FIG. 2 showing the multifunction power conversion device according to the first embodiment of the present invention. As shown in FIG. 2, the multifunction power conversion device of the first embodiment is substantially an architecture of the second side feedback mechanism for power conversion with dynamical detection, and comprises an input filter unit 10, a transformer TR, a switching transistor 20, a driving controller 30A, a feedback unit 40 and an output unit 50. The transformer TR comprises a primary coil LP, a secondary coil LS and an auxiliary coil LA. The switching transistor 20 is a MOS (metal oxide semiconductor) power transistor, and has a drain, a gate and a source. However, the switching transistor 20 can also be implemented by any other electronic driving element, such as a bipolar transistor.

Specifically, the input filter unit 10 receives and filters an AC power VAC to generate an input power VIN. Additionally, one end of the primary coil LP of the transformer TR is connected to the input filter unit 10 for receiving the input power VIN, and another end of the primary coil LP is connected to the drain of the switching transistor 20. The auxiliary coil generates an auxiliary sensing voltage by induction of the primary and secondary coils LP/LS. Further, one end of the auxiliary coil LA is grounded, another end of the auxiliary coil LA is connected to one end of a zero sensing diode D1, and another end of the auxiliary coil LA is connected to one end of a zero sensing resistor RZ. Another end of the zero sensing resistor RZ is connected to the source of the switching transistor 20 and one end of a sensing resistor RS, and another end of a sensing resistor RS is grounded. Particularly, the another end of the zero sensing resistor RZ generates and transmits a current sensing zero detection signal CS_ZC to the driving controller 30A.

With induction of a current flowing through the primary coil LP, the secondary coil LS generates an induction current, which is transmitted to the output unit 50. The output unit 50 generally comprises an output capacitor Co and an output diode D2. One end of the secondary coil LS is connected to a positive end of the output diode D2, and another end of the secondary coil LS is grounded and further connected to one end of the output capacitor Co. Another end of the output capacitor Co is connected to a negative end of the output diode D2 such that the negative end of the output diode D2 generates an output power VOUT and the output unit 50 provides an output current IOUT.

One end of the feedback unit 40 is connected to the negative end of the output diode D2 for receiving the output power VOUT, and the feedback unit 40 performs a feedback control process to generate and transmit a feedback comparison signal COMP to the diving controller 30A. Specifically, the feedback control process is configured to implement at least one of function of constant voltage and constant current, and the feedback unit 40 is preferably implemented by a photo coupler or an additional feedback coil used to sensing the secondary coil such that a feedback sensing signal is generated through the feedback control process and taken as the feedback comparison signal COMP.

Furthermore, the diving controller 30A receives the current sensing zero detection signal CS_ZC and the feedback comparison signal COMP, and performs a zero detection process and a current monitoring process to generate and transmit the driving signal GATE to the gate of the switching transistor 20 for controlling a process of turning on/off of the switching transistor 20. In particular, the driving signal GATE controls the conduction level of the switching transistor 20. In other words, the higher the conduction level is, the larger the turn-on current of the switching transistor 20 is. On the contrary, the lower the conduction level is, the less the turn-on current is.

Figure 3:
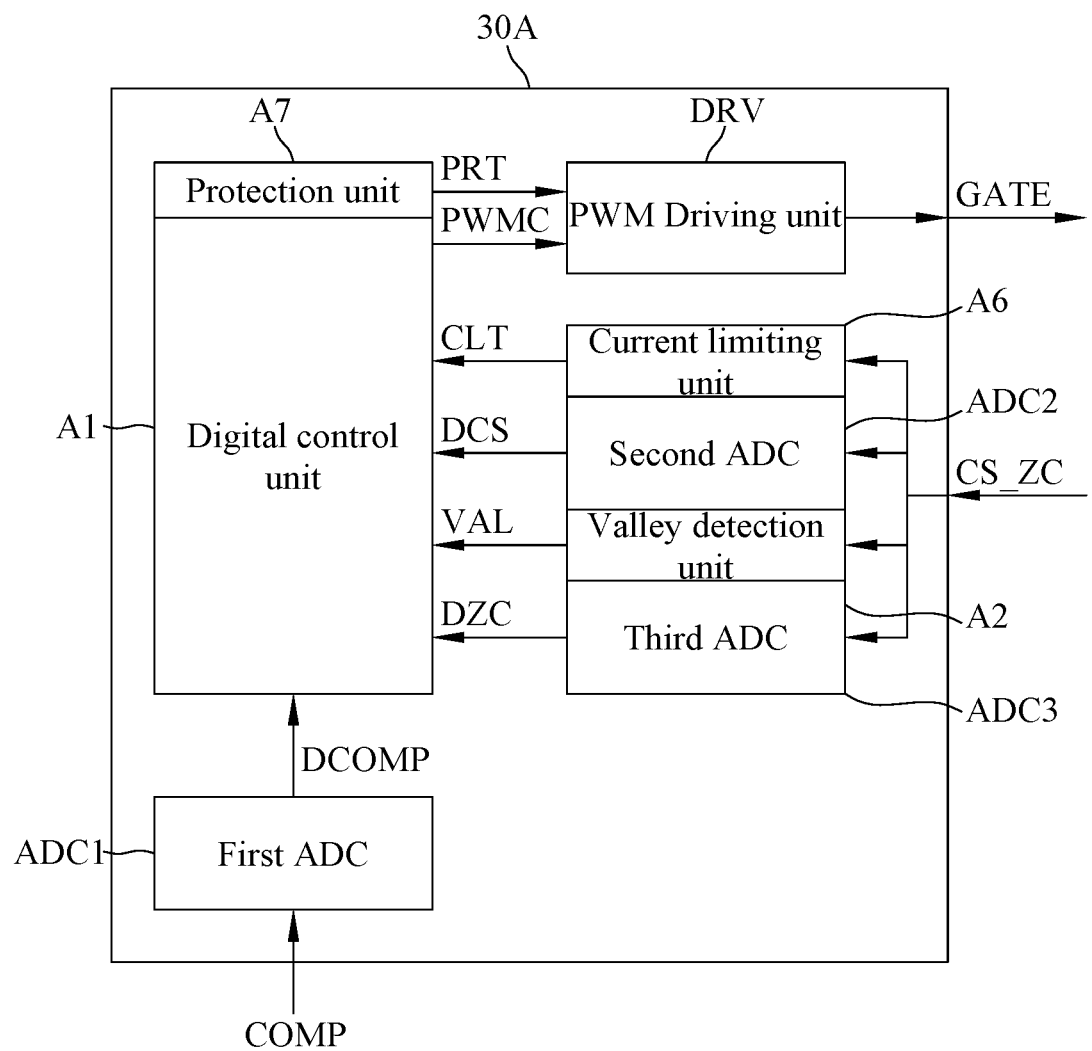
FIG. 3 is a view showing the driving controller of the first embodiment.

As shown in FIG. 3, the diving controller 30A specifically comprises a first analog-to-digital converter (ADC) ADC1, a second ADC ADC2, a third ADC ADC3, a PWM driving unit DRV, a digital control unit A1, a valley detection unit A2, a current limiting unit A6 and a protection unit A7. The first ADC ADC1 receives and converts the feedback comparison signal COMP into a corresponding digital comparison signal DCOMP, and the second ADC ADC2 and the third ADC ADC3 simultaneously receive the current sensing zero detection signal CS_ZC and generate a digital current sensing signal DCS and a digital zero detection signal DZC, respectively. The digital control unit A1 receives the digital comparison signal DCOMP, the digital current sensing signal DCS and the digital zero detection signal DZC to generate and transmit a PWM control signal PWMC. Thus, the PWM driving unit DRV generates the driving signal GATE based on the PWM control signal PWMC.

When the switching transistor 20 is turned on by the driving signal GATE, the turn-on current IQ of the switching transistor 20 flows through the primary coil LP, the switching transistor 20 and the sensing resistor RS. At this time, the auxiliary current flowing through the zero detection diode D1 and the zero detection resistor RZ from the auxiliary coil LA is zero, and the current sensing zero detection signal CS_ZC of the sensing resistor RS is thus generated by the turn-on current IQ and provided to the digital control unit A1 to determine whether to turn off the switching transistor 20.

When the switching transistor 20 is turned on by the driving signal GATE, the turn-on current IQ rapidly reduces to zero, and at the same time, the current IDOUT of the output diode D2 fast increases up to a maximum peak value, and then gradually reduces to zero because of discharge of the second side current for the second coil LS. Thus, when the switching transistor 20 is turned off, the current sensing zero detection signal CS_ZC is used to detect the signal Vaux of the auxiliary coil LA. Before the second side current discharges to zero, the auxiliary coil voltage continuously senses the second side output voltage. Once the second side current reduces to zero, as so-called knee, the voltage of the auxiliary coil LA undergoes LC oscillation. At this time, the valley detection unit A2 detects the valley of current sensing zero detection signal CS_ZC to generate a valley detection signal VAL. In other words, the valley is specified by detecting a zero crossing point. The digital control unit A1 receives the valley detection signal VAL to implement the function of zero detection.

In addition, the digital control unit A1 further calculates the accumulated number of the valley and determines whether to turn on the switching transistor 20 after a preset number of the valley, thereby reducing switching loss and improving efficiency of power conversion. Moreover, the digital control unit A1 may set up a block time to avoid noise interference when the switching transistor 20 is switched.

More specifically, the digital control unit A1 receives and compares the digital comparison signal DCOMP and the digital current sensing signal DCS so as to determine whether to turn on/off the switching transistor 20 and generate the PWM control signal PWMC. At the same time, the slope of the turn-on current IQ can be detected real time.

When the switching transistor 20 is turned on, the current limiting unit A6 receives the current sensing zero detection signal CS_ZC, and a current limiting signal CLT is generated when the current sensing zero detection signal CS_ZC is larger than a preset value, indicating that the turn-on current IQ of the switching transistor 20 is overestimate. The digital control unit A1 receives and uses the current limiting signal CLT to control the protection unit A7 to generate a protection signal PRT to the PWM driving unit DRV for turning off the switching transistor 20, thereby providing protection for limiting the turn-on current IQ.

Additionally, the digital control unit A1 is a fully digital operating electronic device, and preferably implemented by an integrated circuit (IC) of a microcontroller for executing a specific firmware program to achieve electrical functions as desired.

Figure 4:
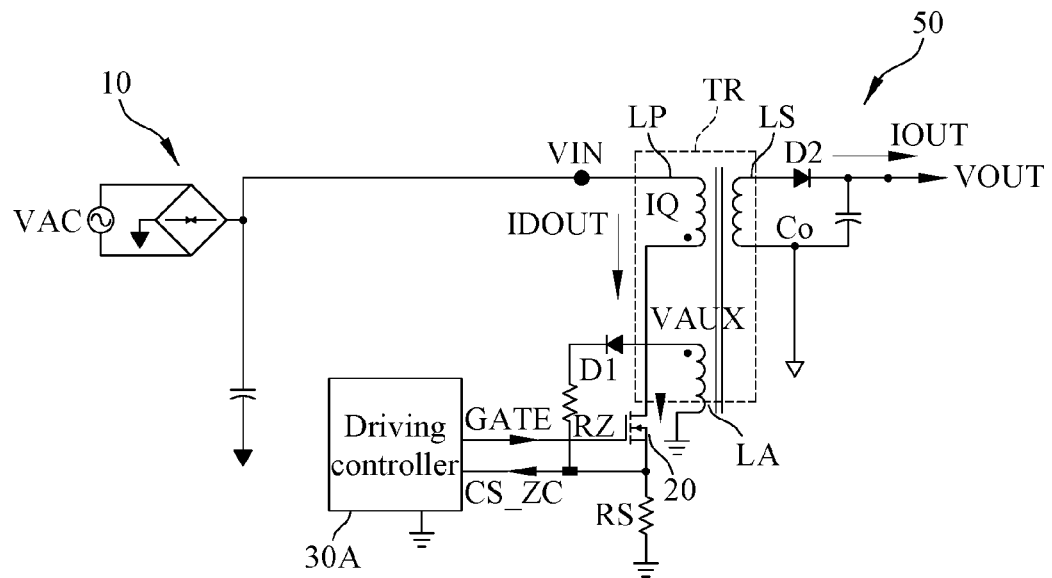
FIG. 4 is a view of the multifunction power conversion device according to the second embodiment of the present invention.

Further refer to FIG. 4 illustrating the multifunction power conversion device according to the second embodiment of the present invention. As shown in FIG. 4, the multifunction power conversion device of the second embodiment is similar to the first embodiment as mentioned above, and comprises an input filter unit 10, a transformer TR, a switching transistor 20, a driving controller 30B and an output unit 50 for implementing power conversion. The input filter unit 10, the transformer TR, the switching transistor 20, the driving controller 30B and the output unit 50 of the second embodiment are similar to those of the first embodiment, and the detailed description is omitted hereinafter. It should be noted that one of the primary differences between the first and second embodiments is that the first embodiment uses the second side feedback architecture, but the second embodiment uses the first side feedback architecture. In particular, the second embodiment dose not comprises the feedback unit.

Figure 5:
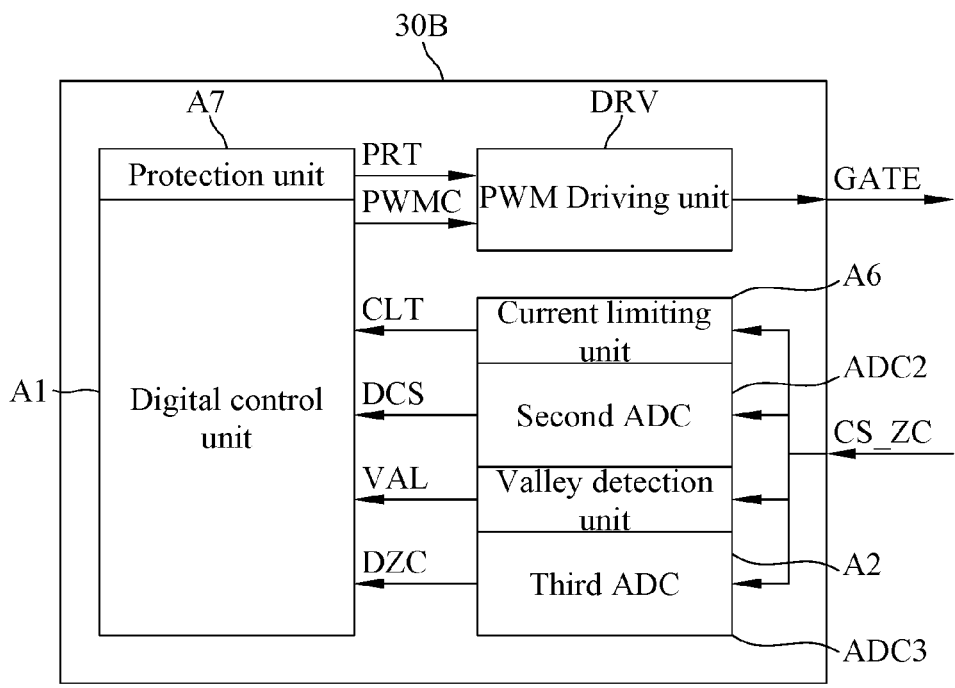
FIG. 5 is a view showing the driving controller of the second embodiment.

Also, refer to FIG. 5 illustrating the driving controller of the second embodiment. As shown in FIG. 5, the driving controller 30B of the second embodiment comprises a second ADC ADC2, a third ADC ADC3, a PWM driving unit DRV, a digital control unit A1, a valley detection unit A2, a current limiting unit A6 and a protection unit A7. It should be noted that the driving controller 30B is similar to the driving controller 30A of the first embodiment, and one of the primary differences between the driving controllers 30A and 30B is that the driving controller 30B does not comprises the first ADC. Thus, only the features of the driving controller 30B are described, and the description of other similar components is omitted hereinafter.

Figure 6:
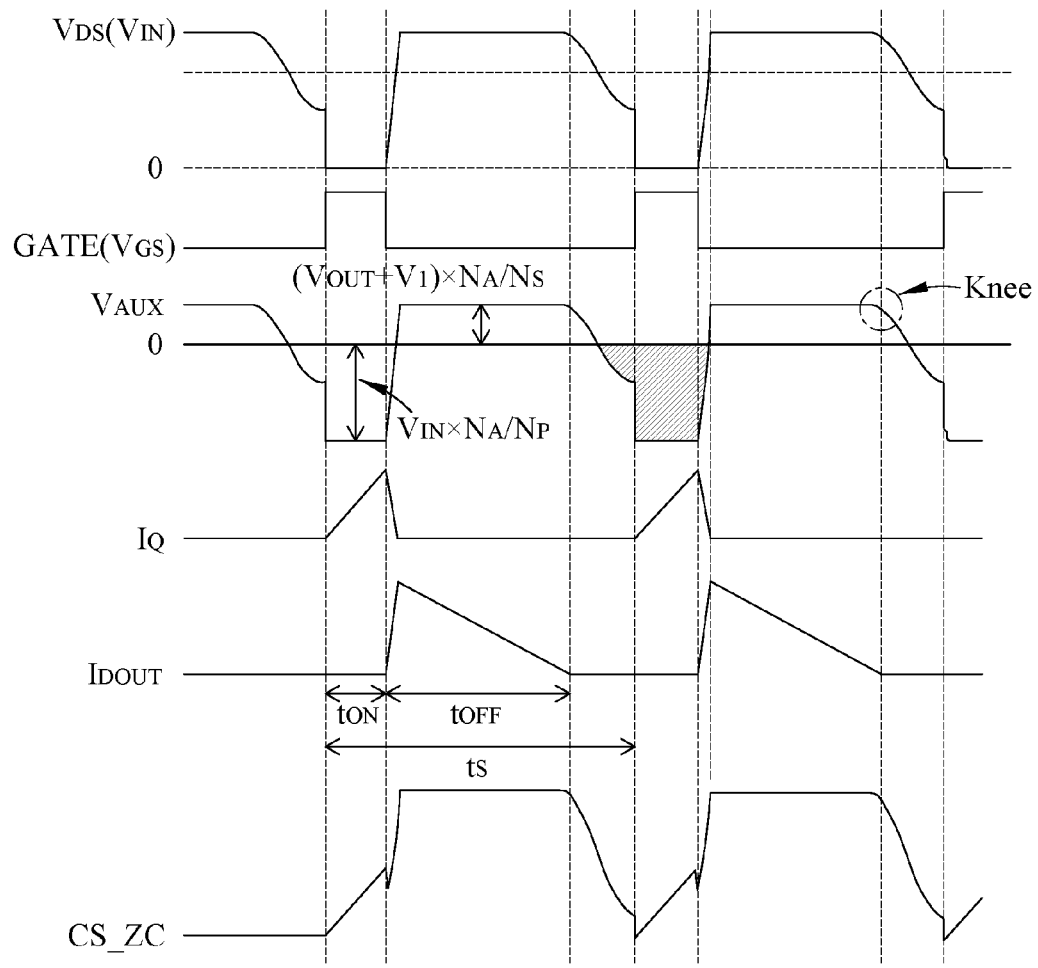
FIG. 6 is a typical transfer diagram for the multifunction power conversion device of the second embodiment.
Figure 7:
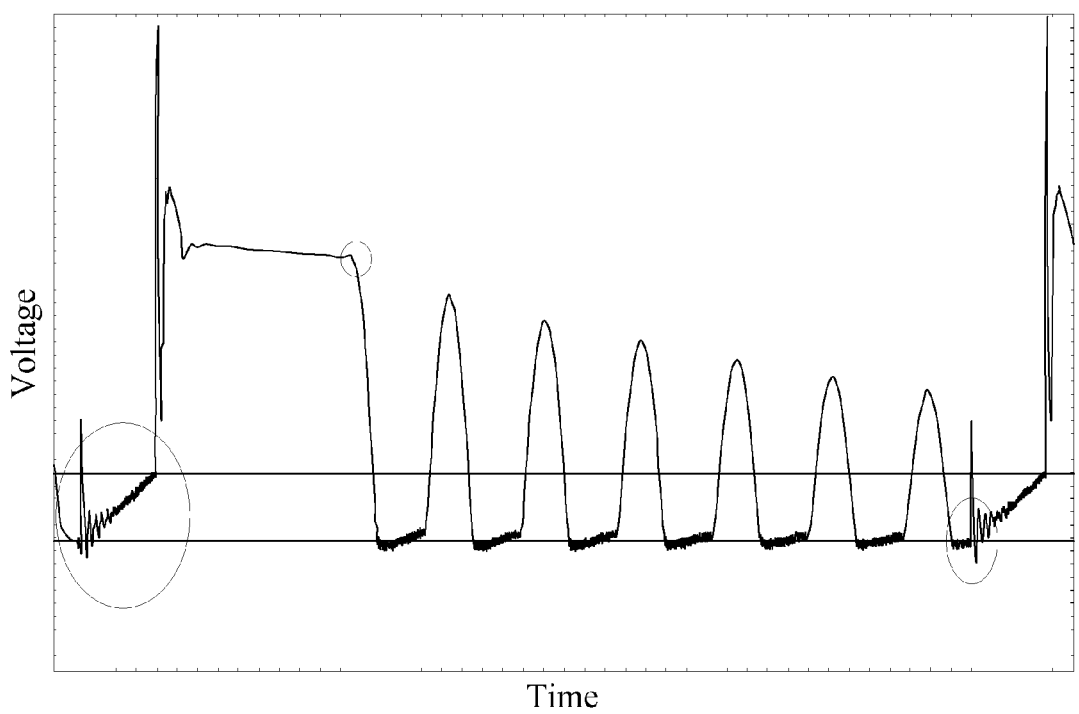
FIG. 7 is another typical transfer diagram for the current sensing zero detection signal CS_ZC in FIG. 6.

Since the second embodiment does utilize the feedback unit to provide the related information of the loading state, the driving controller 30B obtains the loading state through calculation. Please refer to FIGS. 6 and 7 showing one typical transfer diagram for the multifunction power conversion devices of the second embodiment and another typical transfer diagram for the current sensing zero detection signal CS_ZC, respectively.

Specifically, when the switching transistor 20 is turned off, the driving controller 30B first detects an auxiliary coil voltage indicated by (VOUT+Vf)*(NA/NS) before the current flowing through the secondary coil (as so-called the second side current) reduces to zero due to discharge, where Vf is a turn on voltage for the zero detection diode D1, NA is a winding number of the auxiliary coil LA, and NS is a winding number of the secondary coil LS. In addition, when the switching transistor 20 is turned on, an auxiliary coil voltage VAUX of the auxiliary coil LA is specified by −VIN*NA/NP, where NP is a winding number of the primary coil LP. Particularly, when the switching transistor 20 is turns off, the auxiliary coil LA senses the voltage and the current of the second side, and the output current IOUT of the output unit 50 is thus obtained through calculation according to the specific equation below, $$I_{OUT}(t) = \frac{1}{2} \times \frac{t_{OFF}(t)}{t_S(t)} \times I_{DOUT\_PK}(t)$$
$$= \frac{1}{2} \times \frac{t_{OFF}(t)}{t_S(t)} \times \frac{N_P}{N_S} \times \frac{V_{CS\_PK}(t)}{R_{CS}}$$

where tOFF is a time width when the output diode current IDOUT is not zero, tS is a period of the driving signal GATE, IDOUT_PK is a maximum peak value of the output diode current IDOUT, and VCS_PEAK is a maximum peak value of the current sensing zero detection signal CS_ZC.

Further, the digital control unit A1 of the driving controller 30B can detect the time when the output diode current IDOUT reduces to zero (the time when the knee occurs) by only detecting the current sensing zero detection signal CS_ZC, and thus the time width tOFF is obtained. Additionally, the digital control unit A1 may use the digital zero detection signal DZC to determine the number of valley to turn on the switching transistor 20. For example, the switching transistor 20 is turned on at the seventh valley in FIG. 7. At this time, tS for the period of the driving signal GATE is obtained. Thus, the digital control unit A1 may detect the digital current sensing signal DCS to obtain IDOUT_PK of the output diode current IDOUT. After tOFF, tS and IDOUT_PK are brought into the above equation, the output current IOUT is calculated, thereby acquiring the loading state. When the output current IOUT is larger than a preset value, the switching transistor 20 is turned off. Therefore, without any traditional feedback unit, the second embodiment of the present invention can implement the first side feedback function for power conversion just through simple calculation by the digital control unit A1.

From the above mention, one primary feature of the present invention is that the current sensing zero detection signal is generated by directly combining the sensing signals from the first and auxiliary coils and provided to the second side feedback architecture with the feedback unit. The current sensing zero detection signal is fed to the digital control unit through the single sensing pin. When the switching transistor is turned on, the digital control unit utilizes the current limiting unit to sense the current sensing zero detection signal and performs the current limiting process so as to generate the current limiting signal for determining if the output current is larger than the preset value. When the output current is larger than the preset value, the switching transistor is turned off, and the feedback comparison signal generated by the feedback unit is converted into the digital feedback comparison signal by the analog-to-digital converter. The digital control unit obtains the loading state based on the digital feedback comparison signal, and further turns on the switching transistor at the valley, thereby greatly reducing switching loss and improving efficiency of power conversion. In particular, the switching transistor is turned on after a preset number of the valley so as to achieve optimization for power conversion.

Another primary feature of the present invention is that the first side feedback architecture without any feedback unit also employs the single sensing pin to receive the current sensing zero detection signal formed of the sensing signals from the first and auxiliary coils, but the digital control unit directly utilizes the auxiliary voltage of the auxiliary coil to obtain the output current of the secondary coil through simple calculation when the switching transistor is turned on or off, thereby acquiring the loading state. Accordingly, the switching transistor is properly turned on/off to implement the function of power conversion.

Therefore, the present invention greatly reduces switching loss and dramatically improves overall efficiency of power conversion so as to exhibit considerable industrial utility. The digital control unit is specifically configured to operate in a full digital manner such that the actual requirements are thus easy to meet by just updating the program. The flexibility of application for the present invention is obviously enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A multifunction power conversion device, comprising:
an input filter unit for receiving and filtering an AC power to generate an input power;
a transformer comprising a primary coil, a secondary coil and an auxiliary coil, a first end of the primary coil connected to the input filter unit for receiving the input power, an auxiliary sensing voltage generated by the auxiliary coil due to induction of the primary and secondary coils, a first end of the auxiliary coil grounded, an induction current generated by the secondary coil by induction of a current flowing through the primary coil, a second end of the auxiliary coil connected to a first end of a zero detection diode, and a second end of the zero detection diode connected to a first end of a zero detection resistor;
a switching transistor implemented by a MOS (metal oxide semiconductor) power transistor and having a drain, a gate and a source, the drain connected to a second end of the primary coil;
a driving controller generating and transmitting a driving signal to the gate of the switching transistor for controlling a process of turning on/off of the switching transistor;
a feedback unit; and
an output unit comprising an output capacitor and an output diode for receiving the induction current of the secondary coil, a positive end of the output diode connected to a first end of the secondary coil, a second end of the secondary coil grounded and connected to a first end of the output capacitor, a second end of the output capacitor connected to a negative end of the output diode, an output power generated at the negative end of the output diode, and the output unit providing an output current,
wherein the driving controller comprises a first analog-to-digital converter (ADC), a second ADC, a third ADC, a PWM (Pulse Width Modulation) driving unit, a digital control unit, a valley detection unit, a current detection unit, a current limiting unit and a protection unit, the first ADC receives and converts a feedback comparison signal into a corresponding digital comparison signal, the second ADC and the third ADC simultaneously receive a current sensing zero detection signal and generate a digital current sensing signal and a digital zero detection signal, respectively, the current limiting unit receives the current sensing zero detection signal when the switching transistor is turned on, and generates a current limiting signal when the current sensing zero detection signal is larger than a preset value so as to indicate that a turn-on current of the switching transistor is overestimate, the digital control unit receives the digital comparison signal, the digital current sensing signal, the digital zero detection signal and the current limiting signal to generate and transmit a PWM control signal, the PWM driving unit generates the driving signal based on the PWM control signal, the digital control unit controls the protection unit based on the current limiting signal to generate and transmit a protection signal to the PWM driving unit for turning off the switching transistor, the digital control unit uses the current sensing zero detection signal to determine when the switching transistor turned on by the driving signal is to be turned off, and the digital control unit further utilizes the digital zero detection signal to detect a valley through a zero detection process when the switching transistor is turned off by the driving signal, and calculates an accumulated number of valleys for turning on the switching transistor after a preset number of valleys so as to reduce switching loss.

2. The multifunction power conversion device as claimed in claim 1, wherein a feedback control process is configured to implement at least one of functions of constant voltage and constant current.

3. The multifunction power conversion device as claimed in claim 1, wherein the feedback unit is implemented by a photo coupler.

4. The multifunction power conversion device as claimed in claim 1, wherein the digital control unit further sets a block time to avoid noise interference upon switching the switching transistor.

5. The multifunction power conversion device as claimed in claim 4, wherein the digital control unit is an electrical unit with digital operation only, and implemented by an integrated circuit (IC) of a microcontroller for executing a specific firmware program to achieve electrical functions as desired.

6. A multifunction power conversion device, comprising:
an input filter unit for receiving and filtering an AC power to generate an input power;
a transformer comprising a primary coil, a secondary coil and an auxiliary coil, a first end of the primary coil connected to the input filter unit for receiving the input power, an auxiliary sensing voltage generated by the auxiliary coil due to induction of the primary and secondary coils, a first end of the auxiliary coil grounded, an induction current generated by the secondary coil by induction of a current flowing through the primary coil, a second end of the auxiliary coil connected to a first end of a zero detection diode, and a second end of the zero detection diode connected to a first end of a zero detection resistor;
a switching transistor implemented by a MOS (metal oxide semiconductor) power transistor and having a drain, a gate and a source, the drain connected to a second end of the primary coil;
a driving controller generating and transmitting a driving signal to the gate of the switching transistor for controlling a process of turning on/off of the switching transistor; and
an output unit comprising an output capacitor and an output diode for receiving the induction current of the secondary coil, a positive end of the output diode connected to a first end of the secondary coil, a second end of the secondary coil grounded and connected to a first end of the output capacitor, a second end of the output capacitor connected to a negative end of the output diode, an output power generated at the negative end of the output diode, and the output unit providing an output current,
wherein the second end of the zero detection resistor is connected to the source of the switching transistor and a first end of a sensing resistor, a second end of the sensing resistor is grounded, the second end of the zero detection resistor generates and transmits a current sensing zero detection signal to the driving controller, and the diving controller receives and uses the current sensing zero detection signal to obtain the output current by calculation when the switching transistor is turned on or off so as to perform a zero detection process and a current monitoring process and generate the driving signal.

7. The multifunction power conversion device as claimed in claim 6, wherein the driving controller comprises a second ADC, a third ADC, a PWM (Pulse Width Modulation) driving unit, a digital control unit, a valley detection unit, a current detection unit, a current limiting unit and a protection unit, the second ADC and the third ADC simultaneously receive the current sensing zero detection signal and generate a digital current sensing signal and a digital zero detection signal, respectively, the current limiting unit receives the current sensing zero detection signal when the switching transistor is turned on, and generates a current limiting signal when the current sensing zero detection signal is larger than a preset value so as to indicate a turn-on current of the switching transistor is overestimate, the digital control unit receives the digital current sensing signal, the digital zero detection signal and the current limiting signal to generate and transmit a PWM control signal, the PWM driving unit generates the driving signal based on the PWM control signal, the digital control unit controls the protection unit based on the current limiting signal to generate and transmit a protection signal to the PWM driving unit for turning off the switching transistor, the digital control unit uses the current sensing zero detection signal to determine when the switching transistor turned on by the driving signal is to be turned off, before the current flowing through the secondary coil reduces to zero due to discharge, the digital control unit first detects an auxiliary coil voltage indicated by $(V_{OUT}+V_f)*(N_A/N_S)$ when the switching transistor is turned off by the driving signal, Vf is a turn on voltage for the zero detection diode, VOUT is an output power voltage, NA is a winding number of the auxiliary coil, NS is a winding number of the secondary coil, an auxiliary coil voltage VAUX of the auxiliary coil is specified by $-V_{IN}*N_A/N_P$ when the switching transistor is turned on, VIN is an input power voltage, NP is a winding number of the primary coil, the digital control unit uses a specific equation below to obtain the output current, $$I_{OUT}(t) = \frac{1}{2} \times \frac{t_{OFF}(t)}{t_S(t)} \times I_{DOUT\_PK}(t)$$
$$= \frac{1}{2} \times \frac{t_{OFF}(t)}{t_S(t)} \times \frac{N_P}{N_S} \times \frac{V_{CS\_PK}(t)}{R_{CS}}$$

tOFF is a time width when a current of the output diode is not zero, tS is a period of the driving signal, IDOUT_PK is a maximum peak value of the current of the output diode, VCS_PK is a maximum peak value of the current sensing zero detection signal, the digital control unit obtains tOFF by detecting the digital zero detection signal, the digital control unit determines to turn on the switching transistor at a specific number of valleys based on the digital zero detection signal, and obtains tS, IDOUT_PK is obtained by detecting the digital current sensing signal, and after the output current is calculated, the digital control unit turns off the switching transistor when the output current is larger than a preset value.

8. The multifunction power conversion device as claimed in claim 7, wherein the digital control unit further sets a block time to avoid noise interference upon switching the switching transistor.

9. The multifunction power conversion device as claimed in claim 7, wherein the digital control unit is an electrical unit with digital operation only, and implemented by an integrated circuit (IC) of a microcontroller for executing a specific firmware program to achieve electrical functions as desired.

* * * * *